US012675831B2

(12) United States Patent (10) Patent No.: US 12,675,831 B2
Ali et al. (45) Date of Patent: Jul. 7, 2026

(54) AUTOMATED METHOD AND SYSTEM FOR EXTRACTION AND CLASSIFICATION OF STATUTE FACETS FROM LEGAL STATUTES

(71) Applicant: Tata Consultancy Services Limited, Mumbai (IN)

(72) Inventors: Basit Ali, West Bengal (IN); Ramandeep Singh, Delhi (IN); Girish Keshav Palshikar, Pune (IN); Sachin Sharad Pawar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/677,463

(22) Filed: May 29, 2024

(65) Prior Publication Data

US 2024/0420261 A1    Dec. 19, 2024

(30) Foreign Application Priority Data

Jun. 17, 2023    (IN) .............................. 202321041263

(51) Int. Cl.
 *G06Q 50/18* (2012.01)
 *G06F 16/28* (2019.01)
(52) U.S. Cl.
 CPC ........... *G06Q 50/18* (2013.01); *G06F 16/285* (2019.01)
(58) Field of Classification Search
 CPC .............................. G06Q 50/18; G06F 16/285
 See application file for complete search history.

(56) References Cited

U.S. PATENT DOCUMENTS 12,086,539 B2 * 9/2024 Yin ...................... G06F 16/3329
12,124,814 B2 * 10/2024 Perez ...................... G06F 40/58
(Continued)

FOREIGN PATENT DOCUMENTS

CN      112069307 A     7/2023

OTHER PUBLICATIONS

Kim MY, Rabelo J, Okeke K, Goebel R. Legal Information Retrieval and Entailment Based on BM25, Transformer and Semantic Thesaurus Methods. Rev Socionetwork Strateg. 2022;16(1):157-174. doi: 10.1007/s12626-022-00103-1. Epub Feb. 7, 2022. PMID: 35535319; PMCID: PMC9075849. (Year: 2022).*
(Continued)

*Primary Examiner* — Maria C Santos-Diaz
(74) *Attorney, Agent, or Firm* — Finnegan, Henderson, Farabow, Garrett & Dunner, LLP

(57) ABSTRACT

Current approaches for identifying statute facets consider facet type similar to rhetorical roles defined for statute text. However, the nature and content of statutes are quite different from court judgements and established set of rhetorical roles for court judgements are either not applicable for statutes or not sufficient to cover all the key aspects in statutes. Present disclosure provides method and system for extraction and classification of statute facets from legal statutes. The system first takes text of a statute as input. The system then automatically extracts candidate statute facets from statute text using dependency structure and then computes statute specificity for candidate statute facets. Thereafter, the system classifies candidate statute facets into facet types using weak supervision for validation purpose. Further, system selects statute facets from candidate statute facets based on statute specificity of candidate statute facet and statute facet type of candidate statute facet using customized filtering technique.

15 Claims, 6 Drawing Sheets

(56) References Cited

U.S. PATENT DOCUMENTS

| | | | |
|---|---|---|---|
| 12,242,977 B2 * | 3/2025 | Pawar | G06F 40/289 |
| 12,334,068 B1 * | 6/2025 | Wang | G06F 40/30 |
| 12,387,057 B2 * | 8/2025 | Manikandan | G06F 40/157 |
| 12,524,624 B2 * | 1/2026 | Chen | G06F 40/40 |
| 2016/0140210 A1 * | 5/2016 | Pendyala | G06F 40/205 |
| | | | 707/737 |
| 2022/0277140 A1 | 9/2022 | Rhim | |
| 2023/0162481 A1 * | 5/2023 | Yuan | G06T 9/00 |
| | | | 382/159 |
| 2023/0229936 A1 * | 7/2023 | Pawar | G06F 40/289 |
| | | | 704/9 |
| 2024/0221404 A1 * | 7/2024 | Wang | G06V 30/1912 |
| 2025/0139366 A1 * | 5/2025 | Gao | G06F 40/137 |
| 2026/0004112 A1 * | 1/2026 | Petrov | G06N 3/0475 |

OTHER PUBLICATIONS

W. Dakka and P. G. Ipeirotis, "Automatic Extraction of Useful Facet Hierarchies from Text Databases," 2008 IEEE 24th International Conference on Data Engineering, Cancun, Mexico, 2008, pp. 466-475, doi: 10.1109/ICDE.2008.4497455. (Year: 2008).*

Rossi, Julien & Kanoulas, Evangelos. (2021). Legal Search in Case Law and Statute Law. 10.48550/arXiv.2108.10127. (Year: 2021).*

Ma, Megan et al., "Deconstructing Legal Text: Object-Oriented Design in Legal Adjudication", Title of the item: MIT Computational Law Report, Date: 2020, Publisher: MIT, Link: https://law.mit.edu/pub/deconstructinglegaltext/release/1.

Ren, Yong et al., "An Ontology-Based and Deep Learning-Driven Method for Extracting Legal Facts from Chinese Legal Texts", Title of the item: Electronics, Date: 2022, vol. 11; Issue: 12, Publisher: MDPI, Link: https://www.mdpi.com/2079-9292/11/12/1821.

* cited by examiner

100

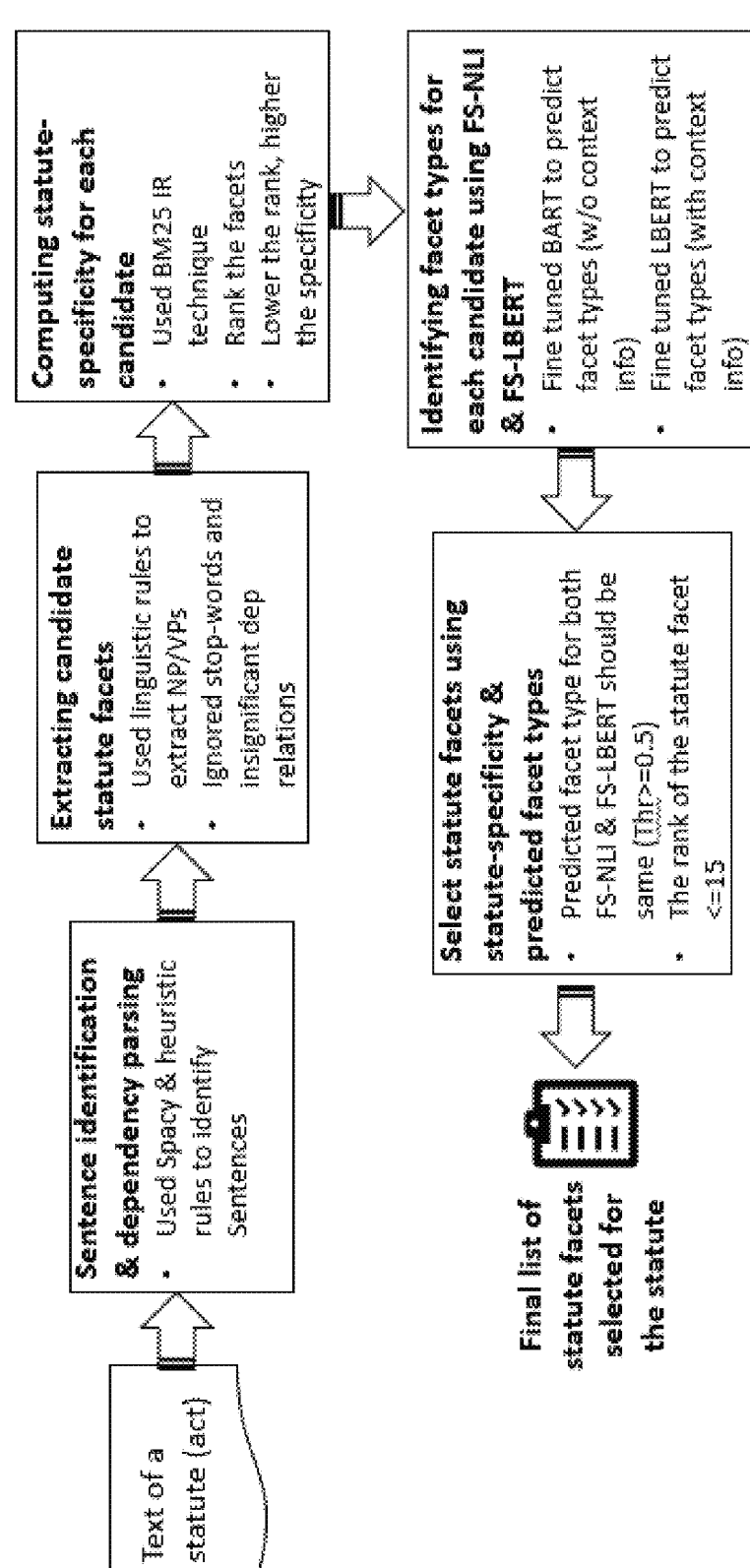

Text of a statute (act)

Sentence identification & dependency parsing
- Used Spacy & heuristic rules to identify Sentences

Extracting candidate statute facets
- Used linguistic rules to extract NP/VPs
- Ignored stop-words and insignificant dep relations

Computing statute-specificity for each candidate
- Used BM25 IR technique
- Rank the facets
- Lower the rank, higher the specificity

Identifying facet types for each candidate using FS-NLI & FS-LBERT
- Fine tuned BART to predict facet types (w/o context info)
- Fine tuned LBERT to predict facet types (with context info)

Select statute facets using statute-specificity & predicted facet types
- Predicted facet type for both FS-NLI & FS-LBERT should be same (Thr>=0.5)
- The rank of the statute facet <=15

Final list of statute facets selected for the statute

FIG. 3 receiving, by a statute facets extraction system (SFES) via one or more hardware processors, a legal document, the legal document comprising a plurality of sections associated with a statute                                                                          402 for each section of the plurality of sections present in the document, performing: 404 identifying, by the SFES via the one or more hardware processors, one or more sentences that are present in a section, and sequence of each sentence of the one or more sentences using a sentence splitting technique                                            404a extracting, by the SFES via the one or more hardware processors, a plurality of candidate statute facets from each sentence of the one or more sentences using a natural language processing technique    404b computing, by the SFES via the one or more hardware processors, statute specificity of each candidate statute facet of the plurality of candidate statute facets using a ranking function                                         404c identifying, by the SFES via the one or more hardware processors, a statute facet type of each candidate statute facet using one or more weakly supervised models                                                           404d selecting, by the SFES via the one or more hardware processors, one or more statute facets from the plurality of candidate statute facets based, at least in part, on the statute specificity of each candidate statute facet and the statute facet type of each candidate statute facet using a customized filtering technique                                                                 404e

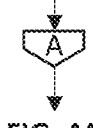

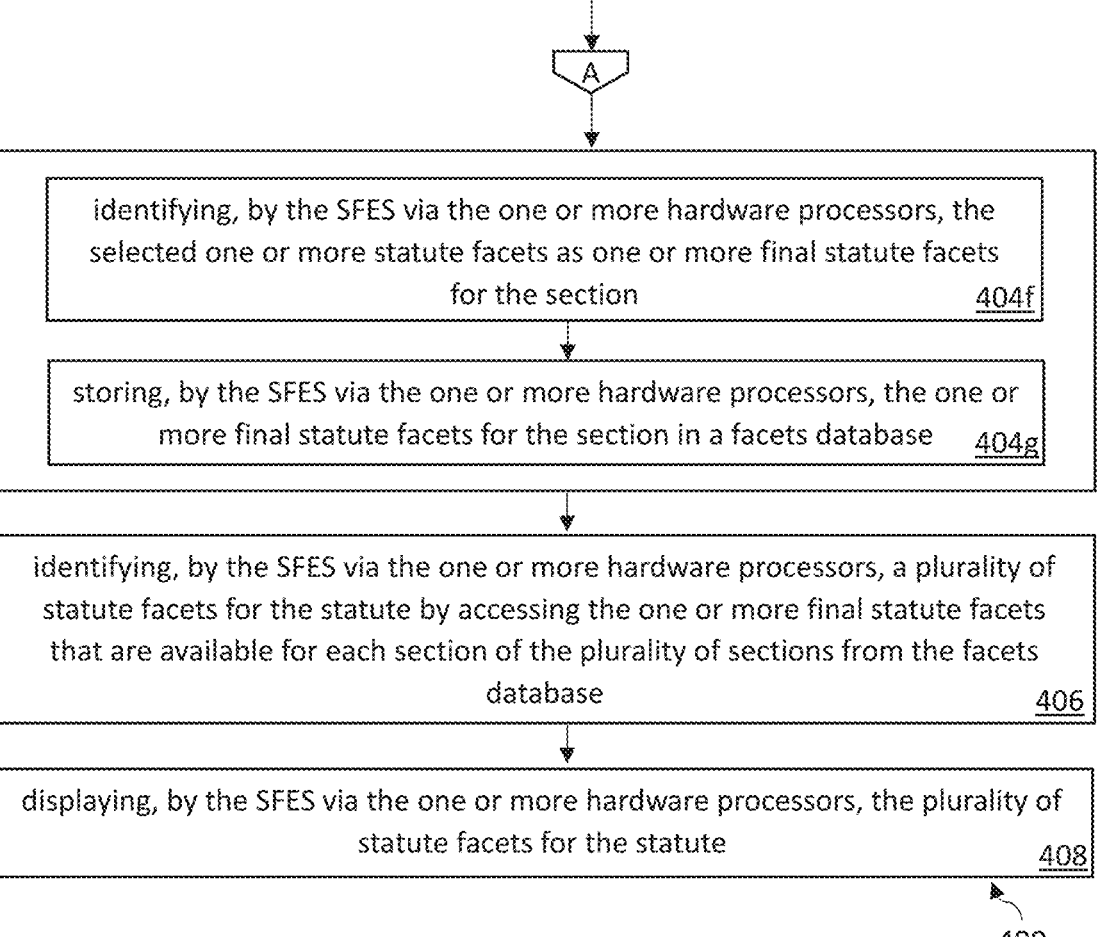

identifying, by the SFES via the one or more hardware processors, the selected one or more statute facets as one or more final statute facets for the section          404f storing, by the SFES via the one or more hardware processors, the one or more final statute facets for the section in a facets database          404g identifying, by the SFES via the one or more hardware processors, a plurality of statute facets for the statute by accessing the one or more final statute facets that are available for each section of the plurality of sections from the facets database          406 displaying, by the SFES via the one or more hardware processors, the plurality of statute facets for the statute          408

The Central Government shall , by notification , appoint an Adjudicating Authority to exercise jurisdiction, powers and authority conferred by or under this Act

| Sno. | Type | Head Word | Complete Phrase | Rank |
|---|---|---|---|---|
| 1. | NP | Government | Central Government | 187 |
| 2. | NP | notification | notification | 272 |
| 3 | VP | Authority | Central Government shall, by notification, appoint an Adjudicating Authority | 1 |
| 4 | NP | Authority | Adjudicating Authority | 1 |
| 5 | VP | exercise | to exercise jurisdiction, powers and authority conferred by or under this Act | 20 |
| 6 | NP | Jurisdiction | Jurisdiction | 94 |
| 7 | NP | powers | powers and authority conferred by or under this Act | 182 |
| 8 | VP | conferred | conferred by or under this Act | 412 |

FIG. 5

| Facet Type | Hypothesis |
|---|---|
| Role | This refers to a person's designation, role, job title, position, responsibility, or work. |
| Organization | This refers to an organization, establishment, or institution such as a company, business, shop, factory, college, but excluding legal organizations like court, tribunal, or government. |
| Legal Organization | This refers to a legal establishment or legal organization such as court, tribunal, ministry or department within government, which carries out processes related to law and justice. |
| Offence | This refers to a crime, criminal activity, offence, guilt, transgression or violation of some law. |
| Obligatory Action | This refers to an action, activity, decision, process, duty, or task which is obligatory, compulsory, mandatory or one that must be carried out. |
| Permissible Action | This refers to an action, activity, decision, process, or task which is permissible or allowable or which represents power or capability to do it |
| Prohibitory Action | This refers to an action, activity, decision, process, or task which is forbidden, prohibited, or not allowed. |
| Condition | This refers to a state, situation, scenario, or a condition which can either be true or false. |
| Evidence Object | This refers to a physical object such as document, material, instrument, or weapon, typically used as evidence in a court of law |
| Punishment | This refers to a punishment such as imprisonment, fine, or penalty |

FIG. 6

AUTOMATED METHOD AND SYSTEM FOR EXTRACTION AND CLASSIFICATION OF STATUTE FACETS FROM LEGAL STATUTES

PRIORITY CLAIM

This U.S. patent application claims priority under 35 U.S.C. § 119 to: India application No. 202321041263, filed on Jun. 17, 2023. The entire contents of the aforementioned application are incorporated herein by reference.

TECHNICAL FIELD

The disclosure herein generally relates to statute facet extraction, and, more particularly, to an automated method and system for extraction and classification of statute facets from legal statutes using weak classification.

BACKGROUND

A statute facet is any specific aspect of an act (statute) which can potentially be used in legal arguments in a case related to a respective act. In general, facets are used by lawyers (or legal professionals) in their arguments. Facets can be interpreted in the sense that how the said section is applicable for a given case description. For example, a lawyer arguing for an employee who has been terminated by the employer, may argue citing the presence or absence of the statute facets from a section 25F of an industrial disputes act (India) such as workman, employer, the workman has been given one month's notice.

However, automatic extraction of these statute facets from legal text is a challenging task due to multiple reasons. Firstly, the statute facets can have several syntactic variations as there can be verb phrases, noun phrases or even adjectival clauses. Secondly, the same statute facet may be mentioned in multiple ways, e.g., 'retrenchment of workmen' and 'workman shall be retrenched by employer' both are mentioned in the section 25F of the industrial disputes act. Thirdly, there is no straightforward and computational way to identify whether any phrase from statutes text can be potentially used in legal arguments.

Some of the prior arts that are available identify factors from the court judgments, but those factors are manually designed using domain knowledge. Some prior arts tried to represent each clause in the act as a formula (or statement) in some mathematical logic, such as 'First-order Predicate Logic' or 'Deontic Logic'. However, automatically constructing a logic-based representation of the text of an act is a hard problem.

SUMMARY

Embodiments of the present disclosure present technological improvements as solutions to one or more of the above-mentioned technical problems recognized by the inventors in conventional systems. For example, in one aspect, there is provided an automated method for extraction and classification of statute facets from legal statutes. The method comprises receiving, by a statute facets extraction system (SFES) via one or more hardware processors, a legal document, the legal document comprising a plurality of sections associated with a statute; for each section of the plurality of sections present in the document, performing: identifying, by the SFES via the one or more hardware processors, one or more sentences that are present in a section, and sequence of each sentence of the one or more sentences using a sentence splitting technique; extracting, by the SFES via the one or more hardware processors, a plurality of candidate statute facets from each sentence of the one or more sentences using a natural language processing technique; computing, by the SFES via the one or more hardware processors, statute specificity of each candidate statute facet of the plurality of candidate statute facets using a ranking function; identifying, by the SFES via the one or more hardware processors, a statute facet type of each candidate statute facet using one or more weakly supervised models; selecting, by the SFES via the one or more hardware processors, one or more statute facets from the plurality of candidate statute facets based, at least in part, on the statute specificity of each candidate statute facet and the statute facet type of each candidate statute facet using a customized filtering technique; identifying, by the SFES via the one or more hardware processors, the selected one or more statute facets as one or more final statute facets for the section; and storing, by the SFES via the one or more hardware processors, the final statute facets for the section in a facets database; identifying, by the SFES via the one or more hardware processors, a plurality of statute facets for the statute by accessing the one or more final statute facets that are available for each section of the plurality of sections from the facets database; and displaying, by the SFES via the one or more hardware processors, the plurality of statute facets for the statute.

In an embodiment, the step of extracting, by the SFES via the one or more hardware processors, the plurality of candidate statute facets from each sentence of the one or more sentences using the natural language processing technique comprises: generating, by the SFES via the one or more hardware processors, a dependency parse tree of each sentence of the one or more sentences using the natural language processing technique; determining, by the SFES via the one or more hardware processors, one or more noun phrases and one or more verb phrases present in each sentence based, at least in part, on the dependency parse tree of a respective sentence, one or more linguistic rules and a part of speech tags of word in the respective sentence; and identifying, by the SFES via the one or more hardware processors, the one or more noun phrases and the one or more verb phrases that are determined for each sentence as the plurality of candidate statute facets for the respective sentence.

In an embodiment, the step of computing, by the SFES via the one or more hardware processors, the statute specificity of each candidate statute facet of the plurality of candidate statute facets using the ranking function comprises: passing, by the SFES via the one or more hardware processors, each candidate statute facet as a query on an index of statute documents to obtain a ranked list of statute documents using the ranking function, wherein the ranked list of statute documents comprises a rank of each statute document with respect to the passed candidate statute facet; and computing, by the SFES via the one or more hardware processors, the statute specificity of each candidate statute facet based, at least in part, on the rank of the statute in the ranked list of statute documents.

In an embodiment, the step of identifying, by the SFES via the one or more hardware processors, a statute facet type of each candidate statute facet using one or more weakly supervised models comprises: for each candidate statute facet, performing: identifying, by the SFES via the one or more hardware processors, a candidate statute facet as a premise; accessing, by the SFES via the one or more hardware processors, a plurality of facet type definitions present in a hypothesis inventory, wherein the hypothesis inventory is maintained in the facet database; for each facet type definition of the plurality of facet type definitions, performing: identifying, by the SFES via the one or more hardware processors, a facet type definition as a hypothesis for the candidate statute facet; determining, by the SFES via the one or more hardware processors, an entailment label and an entailment probability for the candidate statute facet based on the premise and the hypothesis identified for the respective candidate statute facet using a first weakly supervised model; comparing, by the SFES via the one or more hardware processors, the entailment probability determined for the candidate statute facet with a predefined entailment probability threshold; saving, by the SFES via the one or more hardware processors, the entailment label and the entailment probability determined for the candidate statute facet corresponding to the hypothesis in an entailment probability list based on the comparison; accessing, by the SFES via the one or more hardware processors, one or more entailment labels and one or more entailment probabilities stored for the candidate statute facet from the entailment probability list; determining, by the SFES via the one or more hardware processors, an entailment label with a highest entailment probability among the one or more entailment probabilities; selecting, by the SFES via the one or more hardware processors, the determined entailment label for the candidate statute facet; and identifying, by the SFES via the one or more hardware processors, the selected entailment label for the candidate statute facet as a first facet type for the respective candidate statute facet.

In an embodiment, for each candidate statute facet, the method further comprises performing: accessing, by the SFES via the one or more hardware processors, a sentence from which the candidate statute facet is extracted; and determining, the SFES via the one or more hardware processors, a second facet type for the candidate statute facet based on the candidate statute facet and the accessed sentence using a second weakly supervised model.

In an embodiment, the customized filtering technique comprises: for each candidate statute facet, performing: determining whether the statute specificity of the candidate statute facet is within a predefined statute specificity limit; adding the candidate statute facet in an eligible list upon determining that statute specificity is within the predefined statute specificity limit; for each candidate statute facet present in the eligible list, performing: determining whether the first facet type and the second facet type of the candidate statute facet are identical; adding the candidate statute facet in a final list upon determining that the first facet type and the second facet type of the candidate statute facet are identical; and identifying the one or more candidate statute facets present in the final list as one or more statute facets.

In another aspect, there is provided a statute facets extraction system for extraction and classification of statute facets from legal statutes. The system comprises a memory storing instructions; one or more communication interfaces; and one or more hardware processors coupled to the memory via the one or more communication interfaces, wherein the one or more hardware processors are configured by the instructions to: receive a legal document, the legal document comprising a plurality of sections associated with a statute; for each section of the plurality of sections present in the document, perform: identify one or more sentences that are present in a section, and sequence of each sentence of the one or more sentences using a sentence splitting technique; extract a plurality of candidate statute facets from each sentence of the one or more sentences using a natural language processing technique; compute statute specificity of each candidate statute facet of the plurality of candidate statute facets using a ranking function; identify a statute facet type of each candidate statute facet using one or more weakly supervised models; select one or more statute facets from the plurality of candidate statute facets based, at least in part, on the statute specificity of each candidate statute facet and the statute facet type of each candidate statute facet using a customized filtering technique; identify the selected one or more statute facets as one or more final statute facets for the section; and store the final statute facets for the section in a facets database; identify a plurality of statute facets for the statute by accessing the one or more final statute facets that are available for each section of the plurality of sections from the facets database; and display the plurality of statute facets for the statute.

In an embodiment, for extracting the plurality of candidate statute facets from each sentence of the one or more sentences using the natural language processing technique, the one or more hardware processors are configured by the instructions to: generate a dependency parse tree of each sentence of the one or more sentences using the natural language processing technique; determine one or more noun phrases and one or more verb phrases present in each sentence based, at least in part, on the dependency parse tree of a respective sentence, one or more linguistic rules and a part of speech tags of word in the respective sentence; and identify the one or more noun phrases and the one or more verb phrases that are determined for each sentence as the plurality of candidate statute facets for the respective sentence.

In an embodiment, for computing the statute specificity of each candidate statute facet of the plurality of candidate statute facets using the ranking function, the one or more hardware processors are configured by the instructions to: pass each candidate statute facet as a query on an index of statute documents to obtain a ranked list of statute documents using the ranking function, wherein the ranked list of statute documents comprises a rank of each statute document with respect to the passed candidate statute facet; and compute the statute specificity of each candidate statute facet based, at least in part, on the rank of the statute in the ranked list of statute documents.

In an embodiment, for identifying a statute facet type of each candidate statute facet using one or more weakly supervised models, the one or more hardware processors are configured by the instructions to: for each candidate statute facet, perform: identify a candidate statute facet as a premise; access a plurality of facet type definitions present in a hypothesis inventory, wherein the hypothesis inventory is maintained in the facet database; for each facet type definition of the plurality of facet type definitions, perform: identify a facet type definition as a hypothesis for the candidate statute facet; determine an entailment label and an entailment probability for the candidate statute facet based on the premise and the hypothesis identified for the respective candidate statute facet using a first weakly supervised model; compare the entailment probability determined for the candidate statute facet with a predefined entailment probability threshold; save the entailment label and the entailment probability determined for the candidate statute facet corresponding to the hypothesis in an entailment probability list based on the comparison; access one or more entailment labels and one or more entailment probabilities stored for the candidate statute facet from the entailment probability list; determine an entailment label with a highest entailment probability among the one or more entailment probabilities; select the determined entailment label for the candidate statute facet; and identify the selected entailment label for the candidate statute facet as a first facet type for the respective candidate statute facet.

In an embodiment, the one or more hardware processors are configured by the instructions to: for each candidate statute facet, access a sentence from which the candidate statute facet is extracted; and determine a second facet type for the candidate statute facet based on the candidate statute facet and the accessed sentence using a second weakly supervised model.

In an embodiment, the customized filtering technique comprises: determining whether the statute specificity of the candidate statute facet is within a predefined statute specificity limit; adding the candidate statute facet in an eligible list upon determining that statute specificity is within the predefined statute specificity limit; and for each candidate statute facet present in the eligible list, perform: determining whether the first facet type and the second facet type of the candidate statute facet are identical; adding the candidate statute facet in a final list upon determining that the first facet type and the second facet type of the candidate statute facet are identical; and identifying the one or more candidate statute facets present in the final list as one or more statute facets.

In yet another aspect, there are provided one or more non-transitory machine-readable information storage mediums comprising one or more instructions which when executed by one or more hardware processors cause extraction and classification of statute facets from legal statutes by receiving, by a statute facets extraction system (SFES), a legal document, the legal document comprising a plurality of sections associated with a statute; for each section of the plurality of sections present in the document, performing: identifying, by the SFES, one or more sentences that are present in a section, and sequence of each sentence of the one or more sentences using a sentence splitting technique; extracting, by the SFES, a plurality of candidate statute facets from each sentence of the one or more sentences using a natural language processing technique; computing, by the SFES, statute specificity of each candidate statute facet of the plurality of candidate statute facets using a ranking function; identifying, by the SFES, a statute facet type of each candidate statute facet using one or more weakly supervised models; selecting, by the SFES, one or more statute facets from the plurality of candidate statute facets based, at least in part, on the statute specificity of each candidate statute facet and the statute facet type of each candidate statute facet using a customized filtering technique; identifying, by the SFES, the selected one or more statute facets as one or more final statute facets for the section; and storing, by the SFES, the final statute facets for the section in a facets database; identifying, by the SFES, a plurality of statute facets for the statute by accessing the one or more final statute facets that are available for each section of the plurality of sections from the facets database; and displaying, by the SFES, the plurality of statute facets for the statute.

In an embodiment, the step of extracting, by the SFES, the plurality of candidate statute facets from each sentence of the one or more sentences using the natural language processing technique comprises: generating, by the SFES, a dependency parse tree of each sentence of the one or more sentences using the natural language processing technique; determining, by the SFES, one or more noun phrases and one or more verb phrases present in each sentence based, at least in part, on the dependency parse tree of a respective sentence, one or more linguistic rules and a part of speech tags of word in the respective sentence; and identifying, by the SFES, the one or more noun phrases and the one or more verb phrases that are determined for each sentence as the plurality of candidate statute facets for the respective sentence.

In an embodiment, the step of computing, by the SFES, the statute specificity of each candidate statute facet of the plurality of candidate statute facets using the ranking function comprises: passing, by the SFES, each candidate statute facet as a query on an index of statute documents to obtain a ranked list of statute documents using the ranking function, wherein the ranked list of statute documents comprises a rank of each statute document with respect to the passed candidate statute facet; and computing, by the SFES, the statute specificity of each candidate statute facet based, at least in part, on the rank of the statute in the ranked list of statute documents.

In an embodiment, the step of identifying, by the SFES, a statute facet type of each candidate statute facet using one or more weakly supervised models comprises: for each candidate statute facet, performing: identifying, by the SFES, a candidate statute facet as a premise; accessing, by the SFES, a plurality of facet type definitions present in a hypothesis inventory, wherein the hypothesis inventory is maintained in the facet database; for each facet type definition of the plurality of facet type definitions, performing: identifying, by the SFES, a facet type definition as a hypothesis for the candidate statute facet; determining, by the SFES, an entailment label and an entailment probability for the candidate statute facet based on the premise and the hypothesis identified for the respective candidate statute facet using a first weakly supervised model; comparing, by the SFES, the entailment probability determined for the candidate statute facet with a predefined entailment probability threshold; saving, by the SFES, the entailment label and the entailment probability determined for the candidate statute facet corresponding to the hypothesis in an entailment probability list based on the comparison; accessing, by the SFES, one or more entailment labels and one or more entailment probabilities stored for the candidate statute facet from the entailment probability list; determining, by the SFES, an entailment label with a highest entailment probability among the one or more entailment probabilities; selecting, by the SFES, the determined entailment label for the candidate statute facet; and identifying, by the SFES, the selected entailment label for the candidate statute facet as a first facet type for the respective candidate statute facet.

In an embodiment, for each candidate statute facet, performing: accessing, by the SFES, a sentence from which the candidate statute facet is extracted; and determining, the SFES, a second facet type for the candidate statute facet based on the candidate statute facet and the accessed sentence using a second weakly supervised model.

In an embodiment, the customized filtering technique comprises: for each candidate statute facet, performing: determining whether the statute specificity of the candidate statute facet is within a predefined statute specificity limit; adding the candidate statute facet in an eligible list upon determining that statute specificity is within the predefined statute specificity limit; for each candidate statute facet present in the eligible list, performing: determining whether the first facet type and the second facet type of the candidate statute facet are identical; adding the candidate statute facet in a final list upon determining that the first facet type and the second facet type of the candidate statute facet are identical; and identifying the one or more candidate statute facets present in the final list as one or more statute facets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 illustrates a schematic block diagram representation of a statute facet extraction process associated with the system for extracting and classifying statute facets from legal statutes, in accordance with an embodiment of the present disclosure.

FIGS. 4A and 4B, collectively, illustrate an exemplary flow diagram of a method for extraction and classification of statute facets from legal statutes, in accordance with an embodiment of the present disclosure.

FIG. 5 is a tabular representation showing extraction of candidate statute facets from a statute, in accordance with an embodiment of the present disclosure.

FIG. 6 illustrates an example representation of a hypothesis inventory, in accordance with an embodiment of the present disclosure.

DETAILED DESCRIPTION

Figure 1:
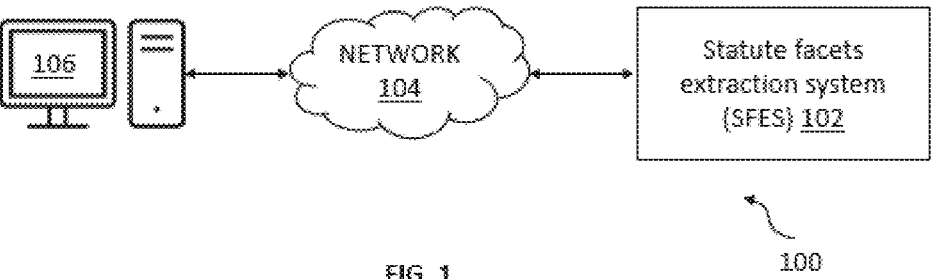
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The text of a statute is rich in legal knowledge related to crimes, disputes, and various legal processes covered under the statute. The understanding of the legal knowledge provided under the statute is very important for people working in the legal field as it can be used for several legal matters, such as legal arguments. So, to simplify and automate certain legal processes for people working in the legal field, the legal knowledge of the statute (also referred as statute facet) needs to be represented in some formal computer analyzable form. Hence, it becomes important to extract legal knowledge specified in the statute.

As discussed earlier, many different kinds of legal knowledge are present in a statute. So, to extract each kind, some prior arts have used mathematical logic such as First-order predicate logic or deontic logic in which each clause of the statute is represented as a formula. However, automatic construction of a logic-based representation of the text of a statute/act is a hard problem due to presence of multiple syntactic variations.

Some available techniques consider facet type similar to rhetorical roles considered for court judgements. However, nature and contents of statutes is quite different from court judgements and the established set of rhetorical roles for court judgements are either not applicable for statutes or not sufficient to cover all the key aspects in statutes.

Thus, there is no known straightforward and computational way to identify statute facets i.e., phrase from statutes text that can be potentially used in legal matters, such as arguments.

Embodiments of the present disclosure overcome the above-mentioned disadvantages by providing a method and a system for extraction and classification of statute facets from legal statutes. The system of the present disclosure automatically extracts a plurality of statute facets present in a statute text using weak supervision. In particular, the system first uses natural language processing techniques to identify candidate statute facets that are present in each section of a statute. Then, the system computes statute specificity of each candidate statute facet. Thereafter, the system determines statute facet type of each candidate statute facet using one or more pretrained weakly supervised models. Further, the system selects one or more statute facets from the candidate statute facets based on the computed statute specificity and the statute facet type of each candidate statute facet.

In the present disclosure, the system and the method use at least two pretrained weekly supervised models for determining facet type of each candidate statute facet, thereby ensuring accurate facet type classification which ultimately leads to accurate statute facet extraction from a statute. The system and the method compute statute specificity of each candidate statute facet, thereby ensuring statute facet is specific to the statute and not a generic one which can be found in other statutes as well. The system uses weekly supervised models, thereby eliminating the need of large volume of labeled data as weak supervision only requires small sets of labeled data.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, computing statute specificity, determining statute facet type, etc. The environment 100 generally includes a statute facets extraction system (hereinafter referred as 'SFES') 102, and an electronic device 106 (hereinafter also referred as user device 106), each coupled to, and in communication with (and/or with access to) a network 104. It should be noted that one user device is shown for the sake of explanation; there can be more number of learner and reviewer devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The user device 106 is associated with a user (e.g., a lawyer/judge) who are involved in a legal case. Examples of the user device 106 include, but are not limited to, a personal computer (PC), a mobile phone, a tablet device, a Personal Digital Assistant (PDA), a server, a voice activated assistant, a smartphone, and a laptop.

The statute facets extraction system (hereinafter referred to as 'SFES') 102 includes one or more hardware processors and a memory. The SFES 102 is first configured to receive a legal document via the network 104 from the user device 106. The legal document includes a plurality of sections associated with a statute. The SFES 102 then automatically extracts a plurality of candidate statute facets from each section of the one or more sections using a dependency structure. Thereafter, the SFES 102 computes a statute specificity for each candidate statute facets. Further, the SFES 102 classify candidate statute facet into statute facet types using weak supervision for validation purpose. Finally, the SFES 102 selects one or more statute facets among the plurality of candidate statute facets based, at least in part, on the statute specificity of each candidate statute facet and the statute facet type of each candidate statute facet using a customized filtering technique. The selected one or more statute facets are then displayed on the user device 106. The process of extraction and classification of statute facets present in each section is explained in detail with reference to FIG. 4.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
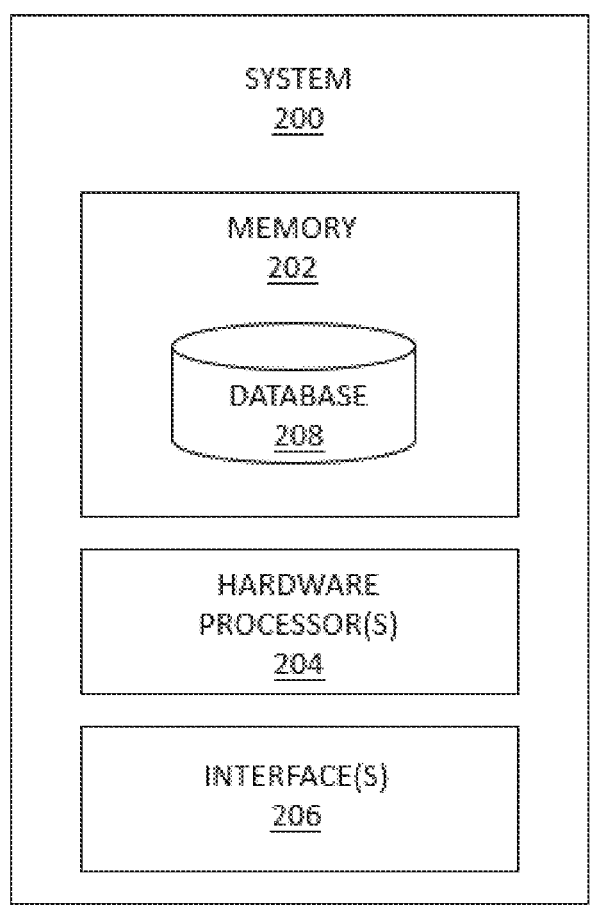
FIG. 2 illustrates an exemplary block diagram of a system for extraction and classification of statute facets from legal statutes, in accordance with an embodiment of the present disclosure.

FIG. 2 illustrates an exemplary block diagram of a statute facets extraction system 200 for extraction and classification of statute facets from legal statutes in accordance with an embodiment of the present disclosure. In an embodiment, the statute facets extraction system 200 may also be referred as system 200 and may be interchangeably used herein. The statute facets extraction system 200 is similar to the SFES 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

In an embodiment, the system 200 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 (also referred as facets database 208) may comprise, but are not limited to, final statute facet, a hypothesis inventory, and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

FIG. 3, with reference to FIGS. 1-2, illustrates a schematic block diagram representation 300 of a statute facet extraction process associated with the system 200 of FIG. 2 or the SFES 102 of FIG. 1 for extracting and classifying statute facets from legal statutes, in accordance with an embodiment of the present disclosure.

As seen in FIG. 3, the system 200 first receives text of an act/statute. The text may include a plurality of sections present in the act. The system 200 then performs sentence identification and dependency parsing. In particular, the system 200 first identifies sentences that are present in each section of the plurality of sections present in the act. Once the sentences are identified, the system 200 obtains a dependency parse tree of each sentence using a natural language processing technique, such as spaCy.

Thereafter, the system 200 extract a plurality of candidate statute facets from each sentence of the one or more sentences based on the dependency parse tree generated for a respective sentence. In particular, one or more noun phrases (NPs) and one or more verb phrases (VPs) that are present in each sentence are identified from the dependency parse tree generated for the respective sentence. The identified NPs and VPs are considered as the candidate statute facets. In an embodiment, for each noun/verb which is not a stop word (i.e., does not include uninformative words, such as month, place, include, consist, and the like) in the dependency parse tree of a sentence, the noun/verb is expanded to get a complete noun phrase/verb phrase. Basically, an entire subtree rooting from the noun/verb is considered as the noun phrase/verb phrase. Further, to avoid any adjunct clauses which do not contribute significantly to the meaning of the phrase, few dependency relations, such as adverbial clause (advcl), appositive clause (appos) and the like are ignored by the system 200.

In an embodiment, for identification of NPs and VPs, a plurality of linguistic rules, such as avoiding adverbial clause and appositive clause are used by the system 200. In at least one example embodiment, the plurality of linguistic rules are predefined and are stored in the database 208.

Once the plurality of candidate statute facets from each sentence are available, the system 200 computes statute specificity for each candidate statute facet. In an embodiment, the system uses a ranking function for computing statute specificity of each candidate statute facet. Thereafter, the system identifies facet type of each candidate statute facet using weakly supervised models, such as few-shots natural language inference (FS-NLI) and few-shots sentence pair classification using legal bidirectional encoder representations from transformers (FS-LBERT). The working of the weakly supervised models is explained in detail with reference to FIG. 4.

Further, the system 200 selects one or more statute facets from the plurality of candidate statute facets based on the statute specificity of each candidate statute facet and the statute facet type of each candidate statute facet using a customized filtering technique (explained with reference to FIG. 4).

Finally, the selected one or more statute facets for the statute are displayed on the user device, such as the user device 106. In one embodiment, the selected one or more statute facets are also stored in the facets database 208 for further use by one or more downstream applications.

FIGS. 4A and 4B, with reference to FIGS. 1 through 3, collectively, represent an exemplary flow diagram of a method 400 for extracting and classifying statute facets from legal statutes, in accordance with an embodiment of the present disclosure. The method 400 may use the system 200 of FIG. 2 and SFES 102 of FIG. 1 for execution. In an embodiment, the system 200 comprises one or more data storage devices or the memory 202 operatively coupled to the one or more hardware processors 204 and is configured to store instructions for execution of steps of the method 400 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2, and the SFES 102 of FIG. 1.

At step 402 of the method of the present disclosure, the one or more hardware processors 204 of the system 200 receive a legal document. The legal document includes a plurality of sections associated with a statute/act.

At step 404 of the method of the present disclosure, the one or more hardware processors 204 of the system 200 extract one or more statute facets for each section of the plurality of sections by iteratively performing a plurality of steps 404a through 404g until statute facets for each section present in the legal document is extracted.

More specifically, at step 404a of the present disclosure, the one or more hardware processors 204 of the system 200 identify one or more sentences that are present in a section, and sequence of each sentence of the one or more sentences using a sentence splitting technique. In an embodiment, a spaCy library and one or more linguistic rules to used split the section text into sequence of sentences. For example, if the sentence 'The Central Government shall, by notification, appoint an Adjudicating Authority to exercise jurisdiction, powers and authority conferred by or under this Act. An Adjudicating Authority shall consist of a Chairperson and two other Members: Provided that one Member each shall be a person having experience in the field of law, administration, finance or accountancy' is a section of a statute, the system 200 provides the below output for the section:

S1: The Central Government shall, by notification, appoint an Adjudicating Authority to exercise jurisdiction, powers and authority conferred by or under this Act.

S2: An Adjudicating Authority shall consist of a Chairperson and two other Members: Provided that one Member each shall be a person having experience in the field of law, administration, finance or accountancy At step 404b of the method of the present disclosure, the one or more hardware processors 204 of the system 200 extract a plurality of candidate statute facets from each sentence of the one or more sentences using a natural language processing technique. The above step can be better understood by way of following description.

As discussed earlier, the system 200 first generates a dependency parse tree of each sentence of the one or more sentences using the natural language processing technique. Examples of the natural language processing technique include, but are not limited to, dependency parsing, constituency parsing etc. Then, the system 200 determines one or more noun phrases and one or more verb phrases present in each sentence based, at least in part, on the dependency parse tree of a respective sentence, one or more linguistic rules and a part of speech tags of word in the respective sentence. So, with respect to the previous example, for the sentence S1—'The Central Government appoint an Adjudicating Authority to exercise jurisdiction . . . ', the dependency parse tree may be created and the NPs and VPs like 'Central Government' may be extracted as candidate statute facet ('Government' (noun) is the head word and its subtree contains 'the' and 'Central' in the parse tree, but as determines do not give any information so they are ignored by the system 200, hence, system 200 considers 'Central Government' as a candidate facet). Similarly, other candidate facet like "appoint" (verb) which is getting expanded to get 'The Central Government appoint an Adjudicating Authority' and ignoring advcl relation is selected by the system 200.

Thereafter, the system 200 identifies the one or more NPs and the one or more VPs that are determined for each sentence as the plurality of candidate statute facets for the respective sentence. The NPs and the VPs selected as candidate statute facets for the sentence S1 are shown in FIG. 5.

At step 404c of the method of the present disclosure, the one or more hardware processors 204 of the system 200 compute statute specificity of each candidate statute facet of the plurality of candidate statute facets using a ranking function. It should be noted that the statute specificity captures those aspects of the statute which are specific to it and are not very generic in meaning. The above step can be better understood by way of following description.

In an embodiment, once the candidate statute facets of each sentence are available, the system 200 passes each candidate statute facet as a query on an index of statute documents to obtain a ranked list of statute documents using the ranking function, such as BM25 ranking function. The ranked list of statute documents includes a rank of each statute document with respect to the passed candidate statute facet. It should be noted that the index of statute documents is prepared using a set of 1248 acts applicable in India and is prestored in the database 208.

Thereafter, the system 200 computes the statute specificity of each candidate statute facet based, at least in part, on the rank of the statute in the ranked list of statute documents. In particular, to compute specificity for any candidate statute facet p for a given statute (say statute A), the system 200 uses p as a query on the index of statute documents and obtains a ranked list of statute documents using the ranking function. Let $R_A$ be the rank of the statute A in this ranked list of statute documents. So, the statute specificity of the candidate statute facet p with respect to the statute A is inversely proportional to the rank $R_A$. In other words, lower the rank of the given statute in the ranked list, higher is the statute-specificity i.e., candidate statute facet is specific to the statute/act and is not very generic in meaning. The rank computed for all candidate statute facets for the sentence S1 is shown with reference to FIG. 5.

At step 404d of the method of the present disclosure, the one or more hardware processors 204 of the system 200 identify a statute facet type of each candidate statute facet using one or more weakly supervised models. The above step can be better understood by way of following description.

In an embodiment, once the ranking is done, the system 200 tries to predict statute facet type of each candidate statute facet using two weakly supervised models to ensure that the candidate statue facet is more likely to be acceptable facet.

So, for predicting statute facet type of each candidate statue facet, the system 200 first uses a first weakly supervised model. In an embodiment, the first weakly supervised model is a few shots-natural language inference (FS-NLI) model.

For using the first weakly supervised model, the system 200, for each candidate statute facet of the plurality of candidate statute facets, first identifies a candidate statute facet as a premise. The system 200 then accesses a plurality of facet type definitions present in a hypothesis inventory. It should be noted that the hypothesis inventory is maintained in the facet database 208. An example of the hypothesis inventory is shown with reference to FIG. 6. Thereafter, for each facet type definition of the plurality of facet type definition, the system 200 identifies a facet type definition as a hypothesis for the candidate statute facet identified as the premise. The system 200 then determines an entailment label and an entailment probability for the candidate statute facet based on the premise and the hypothesis identified for the respective candidate statute facet using a first weakly supervised model. For example, consider the candidate statute facet as 'Central Government shall, by notification, appoint an Adjudicating Authority'. The premise for the candidate statute facet will be: 'Central Government shall, by notification, appoint an Adjudicating Authority' and hypothesis can be 'This refers to an action, activity, decision, process, duty, or task which is obligatory, compulsory, mandatory or one that must be carried out'. The first weakly supervised model, when used by the system 200, may provide the entailment label as 'Obligatory Action' and the entailment probability as '0.90'.

Thereafter, the system 200 compares the entailment probability determined for the candidate statute facet with a predefined entailment probability threshold. Further, the system 200 saves the entailment label and the entailment probability determined for the candidate statute facet corresponding to the hypothesis in an entailment probability list based on the comparison. In particular, if the first weakly supervised model predicts entailment label with probability above some threshold (e.g., say 0.5), the type would be considered as the predicted facet type for the given candidate statute facet.

Once the entailment label and the entailment probability are determined considering each facet type definition as the hypothesis, the system 200 accesses one or more entailment labels and one or more entailment probabilities stored for the candidate statute facet from the entailment probability list. Thereafter, the system 200 determines an entailment label with a highest entailment probability among the one or more entailment probabilities that are accessed. Then, the determined entailment label is selected for the candidate statute facet. Finally, the selected entailment label for the candidate statute facet is identified as a first facet type for the respective candidate statute facet.

The above steps are performed by the system 200 for each candidate statute facet of the plurality of candidate statute facets to determine the first facet type of each candidate statute facet.

Thereafter, the system 200 uses a second weakly supervised model. In an embodiment, the second weakly supervised model is a few-shots sentence pair classification using legal BERT (FS-LBERT) model.

For using the second weakly supervised model, the system 200, for each candidate statute facet of the plurality of candidate statute facets, first accesses a sentence from which the respective candidate statute facet is extracted. Thereafter, the system determines a second facet type for the candidate statute facet based on the candidate statute facet and the accessed sentence using a second weakly supervised model. With reference to the previous example, if the candidate statute facet is 'Central Government shall, by notification, appoint an Adjudicating Authority', and the sentence from which the candidate statute facet is considered is 'The Central Government shall, by notification, appoint an Adjudicating Authority to exercise jurisdiction, powers and authority conferred by or under this Act', then the second facet type for the candidate statute facet as determined by the system can be 'Obligatory Action'.

At step 404e of the method of the present disclosure, the one or more hardware processors 204 of the system 200 select one or more statute facets from the plurality of candidate statute facets based, at least in part, on the statute specificity of each candidate statute facet and the statute facet type of each candidate statute facet using a customized filtering technique. The customized filtering technique is explained in detail below.

For each candidate statute facets of the plurality of candidate statute facets, the customized filtering technique first determines whether the statute specificity of the candidate statute facet is within a predefined statute specificity limit. In an example embodiment, the candidate statute facets having $R_A$ less than or equal to 15 are selected by the customized filtering technique. Thereafter, the candidate statute facet in added in an eligible list upon determining that statute specificity is within the predefined statute specificity limit.

Further, for each candidate statute facet present in the eligible list, it is checked whether the determined first facet type and the second facet type of the candidate statute facet are identical. Upon determining that the first facet type and the second facet type of the candidate statute facet are identical, the candidate statute facet is added in a final list otherwise it is discarded. So, with reference to previous example, the entailment probability is higher than 0.5 as well as the first facet type and the second facet type of the candidate statute facet are identical. Hence, premise example would be selected as one of the final candidate facet, as it satisfies all the aforementioned conditions. Further, the candidate statute facets, such as 'Government,' 'exercise', 'notification', 'jurisdiction', etc., are discarded as $R_A$ calculated for these is greater than 15 and thus is filtered by the customized filtering technique.

The one or more candidate statute facets present in the final list are then identified as one or more statute facets.

At step 404*f* of the method of the present disclosure, the one or more hardware processors 204 of the system 200 identify the selected one or more statute facets as one or more final statute facets for the section. The one or more final statute facets for the section are then stored in a facets database, such as the facets database 208 (refer step 404*g*).

At step 406 of the method of the present disclosure, the one or more hardware processors 204 of the system 200 identify a plurality of statute facets for the statute by accessing the one or more final statute facets that are available for each section of the plurality of sections from the facets database.

At step 406 of the method of the present disclosure, the one or more hardware processors 204 of the system 200 identify a plurality of statute facets for the statute by accessing the one or more final statute facets that are available for each section of the plurality of sections from the facets database. In particular, all the one or more final statute facets that are available in the facets database are identified as the plurality of statute facets for the given statute.

At step 408 of the method of the present disclosure, the one or more hardware processors 204 of the system 200 display the plurality of statute facets for the statute on a user device, such as the user device 106.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, facets are used by lawyers (or legal professionals, law practitioners, attorneys, and the like) in their court arguments, but there has been no attempt made to extract facets and classify them into facet types. Available techniques identify factors from the court judgments, but those factors are manually designed using domain knowledge. So, to overcome the disadvantages, embodiments of the present disclosure provide a method and a system for extracting and classifying statute facets from legal statutes. More specifically, the system and the method automatically perform identification and classification of facets, which further helps in predicting the applicability of the given section for the given case description. The system and the method use at least two pretrained weekly supervised models for determining facet type of each candidate statute facet, thereby ensuring accurate facet type classification which ultimately leads to accurate statute facet extraction from a statute.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by a statute facets extraction system (SFES) via one or more hardware processors, a legal document, the legal document comprising a plurality of sections associated with a statute;

for each section of the plurality of sections present in the document, performing:

identifying, by the SFES via the one or more hardware processors, one or more sentences that are present in a section, and sequence of each sentence of the one or more sentences using a sentence splitting technique;

extracting, by the SFES via the one or more hardware processors, a plurality of candidate statute facets from each sentence of the one or more sentences using a natural language processing technique;

computing, by the SFES via the one or more hardware processors, statute specificity of each candidate statute facet of the plurality of candidate statute facets using a ranking function;

identifying, by the SFES via the one or more hardware processors, a statute facet type of each candidate statute facet using one or more weakly supervised models, wherein few-shots natural language inference (FS-NLI) and few-shots sentence pair classification using legal bidirectional encoder representations from transformers (FS-LBERT) are used as the weakly supervised models, wherein identifying a statute facet type of each using one or more weakly supervised model comprises:

for each candidate statute facet, performing:

identifying, by the SFES via the one or more hardware processors, a candidate statute facet as a premise;

accessing, by the SFES via the one or more hardware processors, a plurality of facet type definitions present in a hypothesis inventory, wherein the hypothesis inventory is maintained in the facet database;

for each facet type definition of the plurality of facet type definitions, performing:

identifying, by the SFES via the one or more hardware processors, a facet type definition as a hypothesis for the candidate statute facet;

determining, by the SFES via the one or more hardware processors, an entailment label and an entailment probability for the candidate statute facet based on the premise and the hypothesis identified for the respective candidate statute facet using a first weakly supervised model;

comparing, by the SFES via the one or more hardware processors, the entailment probability determined for the candidate statute facet with a predefined entailment probability threshold; and saving, by the SFES via the one or more hardware processors, the entailment label and the entailment probability determined for the candidate statute facet corresponding to the hypothesis in an entailment probability list based on the comparison, wherein when the first weakly supervised model predicts entailment label with a probability above a predefined threshold, the type is considered as the predicted facet type for the given candidate statute facet, further comprising:

for each candidate statute facet, performing:

accessing, by the SFES via the one or more hardware processors, a sentence from which the candidate statute facet is extracted; and determining, the SFES via the one or more hardware processors, a second facet type for the candidate statute facet based on the candidate statute facet and the accessed sentence using a second weakly supervised model;

selecting, by the SFES via the one or more hardware processors, one or more statute facets from the plurality of candidate statute facets based, at least in part, on the statute specificity of each candidate statute facet and the statute facet type of each candidate statute facet using a customized filtering technique;

identifying, by the SFES via the one or more hardware processors, the selected one or more statute facets as one or more final statute facets for the section; and storing, by the SFES via the one or more hardware processors, the one or more final statute facets for the section in a facets database;

identifying, by the SFES via the one or more hardware processors, a plurality of statute facets for the statute by accessing the one or more final statute facets that are available for each section of the plurality of sections from the facets database; and displaying, by the SFES via the one or more hardware processors, the plurality of statute facets for the statute on a user device, wherein the plurality of statute facets for the statute are stored in the facets database for further use by one or more downstream applications.

2. The processor implemented method of claim 1, wherein the step of extracting, by the SFES via the one or more hardware processors, the plurality of candidate statute facets from each sentence of the one or more sentences using the natural language processing technique comprises:

generating, by the SFES via the one or more hardware processors, a dependency parse tree of each sentence of the one or more sentences using the natural language processing technique;

determining, by the SFES via the one or more hardware processors, one or more noun phrases and one or more verb phrases present in each sentence based, at least in part, on the dependency parse tree of a respective sentence, one or more linguistic rules and a part of speech tags of word in the respective sentence; and identifying, by the SFES via the one or more hardware processors, the one or more noun phrases and the one or more verb phrases that are determined for each sentence as the plurality of candidate statute facets for the respective sentence, wherein when the one or more noun phrases and the one or more verb phrases is not a stop word in the dependency parse tree of the respective sentence, then expand the dependency parse tree to get the one or more noun phrases and the one or more verb phrases, wherein ignore adjunct clauses associated with predefined dependency relations including adverbial clause and appositive clause, based on a plurality of linguistic rules stored in a database.

3. The processor implemented method of claim 1, wherein the step of computing, by the SFES via the one or more hardware processors, the statute specificity of each candidate statute facet of the plurality of candidate statute facets using the ranking function comprises:

passing, by the SFES via the one or more hardware processors, each candidate statute facet as a query on an index of statute documents to obtain a ranked list of statute documents using the ranking function, wherein the ranked list of statute documents comprises a rank of each statute document with respect to the passed candidate statute facet; and computing, by the SFES via the one or more hardware processors, the statute specificity of each candidate statute facet based, at least in part, on the rank of the statute in the ranked list of statute documents.

4. The processor implemented method of claim 1, wherein the step of identifying, by the SFES via the one or more hardware processors, a statute facet type of each candidate statute facet using one or more weakly supervised models further comprises:

accessing, by the SFES via the one or more hardware processors, one or more entailment labels and one or more entailment probabilities stored for the candidate statute facet from the entailment probability list;

determining, by the SFES via the one or more hardware processors, an entailment label with a highest entailment probability among the one or more entailment probabilities;

selecting, by the SFES via the one or more hardware processors, the determined entailment label for the candidate statute facet; and identifying, by the SFES via the one or more hardware processors, the selected entailment label for the candidate statute facet as a first facet type for the respective candidate statute facet.

5. The processor implemented method of claim 4, wherein the customized filtering technique comprises:

for each candidate statute facet, performing:

determining whether the statute specificity of the candidate statute facet is within a predefined statute specificity limit;

adding the candidate statute facet in an eligible list upon determining that statute specificity is within the predefined statute specificity limit;

for each candidate statute facet present in the eligible list, performing:

determining whether the first facet type and the second facet type of the candidate statute facet are identical;

adding the candidate statute facet in a final list upon determining that the first facet type and the second facet type of the candidate statute facet are identical; and identifying the one or more candidate statute facets present in the final list as one or more statute facets.

6. A statute facets extraction system, comprising:

a memory storing instructions;

one or more communication interfaces; and one or more hardware processors coupled to the memory via the one or more communication interfaces, wherein the one or more hardware processors are configured by the instructions to:

receive a legal document, the legal document comprising a plurality of sections associated with a statute;

for each section of the plurality of sections present in the document, perform:

identify one or more sentences that are present in a section, and sequence of each sentence of the one or more sentences using a sentence splitting technique;

extract a plurality of candidate statute facets from each sentence of the one or more sentences using a natural language processing technique;

compute statute specificity of each candidate statute facet of the plurality of candidate statute facets using a ranking function;

identify a statute facet type of each candidate statute facet using one or more weakly supervised models, wherein few-shots natural language inference (FS-NLI) and few-shots sentence pair classification using legal bidirectional encoder representations from transformers (FS-LBERT) are used as the weakly supervised models, wherein identifying a statute facet type of each using one or more weakly supervised model comprises;

for each candidate statute facet, performing:

identifying, by the SFES via the one or more hardware processors, a candidate statute facet as a premise;

accessing, by the SFES via the one or more hardware processors, a plurality of facet type definitions present in a hypothesis inventory, wherein the hypothesis inventory is maintained in the facet database;

for each facet type definition of the plurality of facet type definitions, performing:

identifying, by the SFES via the one or more hardware processors, a facet type definition as a hypothesis for the candidate statute facet;

determining, by the SFES via the one or more hardware processors, an entailment label and an entailment probability for the candidate statute facet based on the premise and the hypothesis identified for the respective candidate statute facet using a first weakly supervised model;

comparing, by the SFES via the one or more hardware processors, the entailment probability determined for the candidate statute facet with a predefined entailment probability threshold; and saving, by the SFES via the one or more hardware processors, the entailment label and the entailment probability determined for the candidate statute facet corresponding to the hypothesis in an entailment probability list based on the comparison, wherein when the first weakly supervised model predicts entailment label with a probability above a predefined threshold, the type is considered as the predicted facet type for the given candidate statute facet, further comprising:

for each candidate statute facet, performing:

accessing, by the SFES via the one or more hardware processors, a sentence from which the candidate statute facet is extracted; and determining, the SFES via the one or more hardware processors, a second facet type for the candidate statute facet based on the candidate statute facet and the accessed sentence using a second weakly supervised model;

select one or more statute facets from the plurality of candidate statute facets based, at least in part, on the statute specificity of each candidate statute facet and the statute facet type of each candidate statute facet using a customized filtering technique;

identify the selected one or more statute facets as one or more final statute facets for the section; and store the one or more final statute facets for the section in a facets database;

identify a plurality of statute facets for the statute by accessing the one or more final statute facets that are available for each section of the plurality of sections from the facets database; and display the plurality of statute facets for the statute on a user device, wherein the plurality of statute facets for the statute are stored in the facets database for further use by one or more downstream applications.

7. The statute facets extraction system of claim 6, wherein for extracting the plurality of candidate statute facets from each sentence of the one or more sentences using the natural language processing technique, the one or more hardware processors are configured by the instructions to:

generate a dependency parse tree of each sentence of the one or more sentences using the natural language processing technique;

determine one or more noun phrases and one or more verb phrases present in each sentence based, at least in part, on the dependency parse tree of a respective sentence, one or more linguistic rules and a part of speech tags of word in the respective sentence; and identify the one or more noun phrases and the one or more verb phrases that are determined for each sentence as the plurality of candidate statute facets for the respective sentence, wherein when the one or more noun phrases and the one or more verb phrases is not a stop word in the dependency parse tree of the respective sentence, then expand the dependency parse tree to get the one or more noun phrases and the one or more verb phrases, ignore adjunct clauses associated with pre-defined dependency relations including adverbial clause (advcl) and appositive clause (appos), based on a plurality of linguistic rules stored in a database.

8. The statute facets extraction system of claim 6, wherein for computing the statute specificity of each candidate statute facet of the plurality of candidate statute facets using the ranking function, the one or more hardware processors are configured by the instructions to:

pass each candidate statute facet as a query on an index of statute documents to obtain a ranked list of statute documents using the ranking function, wherein the ranked list of statute documents comprises a rank of each statute document with respect to the passed candidate statute facet; and compute the statute specificity of each candidate statute facet based, at least in part, on the rank of the statute in the ranked list of statute documents.

9. The statute facets extraction system of claim 6, wherein for identifying a statute facet type of each candidate statute facet using one or more weakly supervised models, further the one or more hardware processors are configured by the instructions to:

access one or more entailment labels and one or more entailment probabilities stored for the candidate statute facet from the entailment probability list;

determine an entailment label with a highest entailment probability among the one or more entailment probabilities;

select the determined entailment label for the candidate statute facet; and identify the selected entailment label for the candidate statute facet as a first facet type for the respective candidate statute facet.

10. The statute facets extraction system of claim 6, wherein the customized filtering technique comprises:

determine whether the statute specificity of the candidate statute facet is within a predefined statute specificity limit;

add the candidate statute facet in an eligible list upon determining that statute specificity is within the predefined statute specificity limit; and for each candidate statute facet present in the eligible list, perform:

determine whether the first facet type and the second facet type of the candidate statute facet are identical;

add the candidate statute facet in a final list upon determining that the first facet type and the second facet type of the candidate statute facet are identical; and identify the one or more candidate statute facets present in the final list as one or more statute facets.

11. One or more non-transitory machine-readable information storage mediums comprising one or more instructions which when executed by one or more hardware processors cause:

receiving, by a statute facets extraction system (SFES), a legal document, the legal document comprising a plurality of sections associated with a statute;

for each section of the plurality of sections present in the document, performing:

identifying, by the SFES, one or more sentences that are present in a section, and sequence of each sentence of the one or more sentences using a sentence splitting technique;

extracting, by the SFES, a plurality of candidate statute facets from each sentence of the one or more sentences using a natural language processing technique;

computing, by the SFES, statute specificity of each candidate statute facet of the plurality of candidate statute facets using a ranking function;

identifying, by the SFES, a statute facet type of each candidate statute facet using one or more weakly supervised models, wherein few-shots natural language inference (FS-NLI) and few-shots sentence pair classification using legal bidirectional encoder representations from transformers (FS-LBERT) are used as the weakly supervised models, wherein identifying a statute facet type of each using one or more weakly supervised model comprises:

for each candidate statute facet, performing:

identifying, by the SFES via the one or more hardware processors, a candidate statute facet as a premise;

accessing, by the SFES via the one or more hardware processors, a plurality of facet type definitions present in a hypothesis inventory, wherein the hypothesis inventory is maintained in the facet database;

for each facet type definition of the plurality of facet type definitions, performing:

identifying, by the SFES via the one or more hardware processors, a facet type definition as a hypothesis for the candidate statute facet;

determining, by the SFES via the one or more hardware processors, an entailment label and an entailment probability for the candidate statute facet based on the premise and the hypothesis identified for the respective candidate statute facet using a first weakly supervised model;

comparing, by the SFES via the one or more hardware processors, the entailment probability determined for the candidate statute facet with a predefined entailment probability threshold; and saving, by the SFES via the one or more hardware processors, the entailment label and the entailment probability determined for the candidate statute facet corresponding to the hypothesis in an entailment probability list based on the comparison, wherein when the first weakly supervised model predicts entailment label with a probability above a predefined threshold, the type is considered as the predicted facet type for the given candidate statute facet, further comprising:

for each candidate statute facet, performing:

accessing, by the SFES via the one or more hardware processors, a sentence from which the candidate statute facet is extracted; and determining, the SFES via the one or more hardware processors, a second facet type for the candidate statute facet based on the candidate statute facet and the accessed sentence using a second weakly supervised model;

selecting, by the SFES, one or more statute facets from the plurality of candidate statute facets based, at least in part, on the statute specificity of each candidate statute facet and the statute facet type of each candidate statute facet using a customized filtering technique;

identifying, by the SFES, the selected one or more statute facets as one or more final statute facets for the section; and storing, by the SFES, the one or more final statute facets for the section in a facets database;

identifying, by the SFES, a plurality of statute facets for the statute by accessing the one or more final statute facets that are available for each section of the plurality of sections from the facets database; and displaying, by the SFES, the plurality of statute facets for the statute on a user device, wherein the plurality of statute facets for the statute are stored in the facets database for further use by one or more downstream applications.

12. The one or more non-transitory machine-readable information storage mediums of claim 11, wherein the step of extracting, by the SFES the plurality of candidate statute facets from each sentence of the one or more sentences using the natural language processing technique comprises:

generating, by the SFES, a dependency parse tree of each sentence of the one or more sentences using the natural language processing technique;

determining, by the SFES, one or more noun phrases and one or more verb phrases present in each sentence based, at least in part, on the dependency parse tree of a respective sentence, one or more linguistic rules and a part of speech tags of word in the respective sentence; and identifying, by the SFES, the one or more noun phrases and the one or more verb phrases that are determined for each sentence as the plurality of candidate statute facets for the respective sentence, wherein when the one or more noun phrases and the one or more verb phrases is not a stop word in the dependency parse tree of the respective sentence, then expand the dependency parse tree to get the one or more noun phrases and the one or more verb phrases, wherein ignore adjunct clauses associated with predefined dependency relations including adverbial clause and appositive clause, based on a plurality of linguistic rules stored in a database.

13. The one or more non-transitory machine-readable information storage mediums of claim 11, wherein the step of computing, by the SFES the statute specificity of each candidate statute facet of the plurality of candidate statute facets using the ranking function comprises:

passing, by the SFES, each candidate statute facet as a query on an index of statute documents to obtain a ranked list of statute documents using the ranking function, wherein the ranked list of statute documents comprises a rank of each statute document with respect to the passed candidate statute facet; and computing, by the SFES, the statute specificity of each candidate statute facet based, at least in part, on the rank of the statute in the ranked list of statute documents.

14. The one or more non-transitory machine-readable information storage mediums of claim 11, wherein the step of identifying, by the SFES a statute facet type of each candidate statute facet using one or more weakly supervised models further comprises:

accessing, by the SFES, one or more entailment labels and one or more entailment probabilities stored for the candidate statute facet from the entailment probability list;

determining, by the SFES, an entailment label with a highest entailment probability among the one or more entailment probabilities;

selecting, by the SFES, the determined entailment label for the candidate statute facet; and identifying, by the SFES, the selected entailment label for the candidate statute facet as a first facet type for the respective candidate statute facet.

15. The one or more non-transitory machine-readable information storage mediums of claim 14, wherein the customized filtering technique comprises:

for each candidate statute facet, performing:

determining whether the statute specificity of the candidate statute facet is within a predefined statute specificity limit;

adding the candidate statute facet in an eligible list upon determining that statute specificity is within the predefined statute specificity limit;

for each candidate statute facet present in the eligible list, performing:

determining whether the first facet type and the second facet type of the candidate statute facet are identical;

adding the candidate statute facet in a final list upon determining that the first facet type and the second facet type of the candidate statute facet are identical; and identifying the one or more candidate statute facets present in the final list as one or more statute facets.

* * * * *